Patented July 21, 1931

1,815,604

UNITED STATES PATENT OFFICE

AUGUST ALBERT, OF MUNICH, AND JOHANNES PFLEGER, OF FRANKFORT-ON-THE-MAIN, GERMANY, ASSIGNORS TO WINTHROP CHEMICAL COMPANY, OF NEW YORK, N. Y., A CORPORATION OF NEW YORK

ORGANIC MERCURY COMPOUND

No Drawing. Application filed October 27, 1923, Serial No. 671,076, and in Germany October 31, 1922.

When hydroxyketones, ketocarboxylic acids and other substituted ketones of a mixed aliphatic-aromatic character, etc. are mercurated, the mercury may enter either into the nucleus or into the side-chain or both.

Detailed investigations by various scientists have shown that in mercurating phenols, carboxyl acids, nitro-derivatives, amino-derivatives, etc. the mercury enters with extremely great facility into the nucleus. It was therefore to be assumed, that with keto-derivatives of mixed aliphatic aromatic character the mercury would also enter the nucleus, the more so as it is known that benzophenone forms with great ease derivatives in which mercury has been substituted in the nucleus.

We have now found that for instance aldehydo-, keto-, hydroxaldehydo- and hydroxy-keto-carboxyl acids and derivatives thereof, in general the compounds of the structure R—CO—$R_1$, when mercurated in the usual way, give mercury derivatives, where the mercury has not entered the nucleus, but is linked to the aliphatic part. In the formula R—CO—$R_1$ R may mean an aromatic or other cyclic radical, either substituted or not substituted and $R_1$ and aliphatic radical, for instance methyl, ethyl, etc.; or R may mean a mixed cyclic-aliphatic radical and $R_1$ an aliphatic radical or R and $R_1$ can be mixed cyclic-aliphatic radicals. Also it may be advisable to introduce radicals which have a distinct chemico-therapeutical effect or radicals or groups able to render the compounds soluble either in water or in alkaline or acid solution.

To show the way in which the invention may be carried out, we give the following examples:

(1) 20 g. p-acetophenone carboxylic acid are mixed with 30 g. mercuric acetate. The mixture is kept in a preheated oil bath at about 130–140° C. untill the precipitation of the mercury oxide by caustic soda solution ceases. This takes as a rule from 15 to 25 minutes. The new compound of the following probable formula:

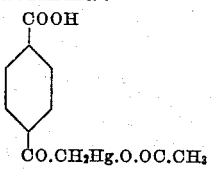

is soluble in sodium carbonate and in caustic alkali. With the quantities as indicated above the acid is kept in excess. Thereby the formation of a di-mercury compound is avoided.

(2) If the molecule of the acid is treated with 2 mol. of mercuric acetate, but otherwise handled in the same way as described in Example (1) a dimercury compound is formed, the constitution of which is probably

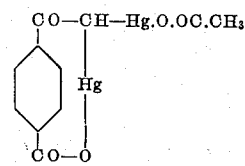

(3) 0.5 g. p-acetophenone arsonic acid are well mixed with 0.5 g. mercuric acetate, whereby a strong odor of acetic acid is noted, probably through formation of the mercury salt. The mixture is heated for one hour at about 130° C. The slightly brown solid mass is boiled with water and the nearly colourless product is filtered by suction. It may be recrystallized from caustic solution. Melting point about 270° C. It probably corresponds with the following formula:

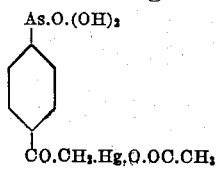

(4) 0.8 g. p-chlor acetophenone mixed with 1.6 g. mercuric acetate are heated for a short time at about 130° C. The melt is suspended in a small quantity of dilute alcohol and the colourless residue filtered by suction and dried. The melting point is higher than 270° C. The product probably has the following formula:

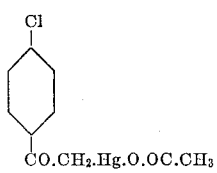

(5) 0.7 g. p-hydroxy-acetophenone and 1.6 g. mercuric acetate are well mixed and heated a short time at a temperature of over 100° C. A brown resinous melt results which is soluble in acetic acid and which after addition of caustic solution gives a colourless precipitate. It dissolves easily in caustic solution in consequence of its hydroxyl content. It decomposes at about 175° C. It probably has the following structure:

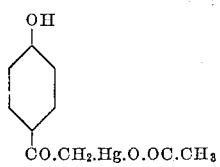

(6) If 0.4 g. p-aminoacetophenone and 1 g. mercuric acetate are heated at temperatures of above 100° C. a dark brown melt results. After cooling it may be treated in the following manner: the melt is dissolved in acetic acid, the solution clarified by treatment with animal charcoal and the yellow base precipitated with caustic solution. It decomposes at about 215° C. and has the following probable formula:

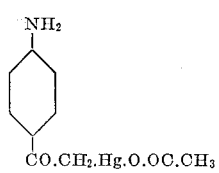

(7) 0.2 g. acetophenone salicylic acid are well mixed with 0.3 g. mercuric acetate and heated for a short time at a temperature of 45° C. and upwards. The melt is stirred up with water, filtered under suction and recrystallized from caustic solution. The product is precipitated as a colourless powder by acidifying the alkaline solution. It probably corresponds with the following formula:

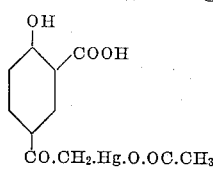

For characterizing the new products mentioned in the following claims there may be said, that the mercury atom always is linked to the aliphatic part and that the new compounds are distinguished by their therapeutical value.

What we claim is:

1. A new mercury compound having therapeutic properties comprising a compound of the general formula—

$$\begin{array}{c} R \\ | \\ C=O \\ | \\ R_1 \end{array}$$

in which R represents a substituted aromatic residue and $R_1$ a mercurated aliphatic residue.

2. A new mercury compound having therapeutic properties comprising a compound of the general formula—

$$\begin{array}{c} X \\ | \\ R \\ | \\ C=O \\ | \\ R_1 \end{array}$$

in which R represents an aromatic residue which may be substituted or not, X an acid group and $R_1$ a mercurated aliphatic residue.

3. A new mercury compound having therapeutic properties comprising a compound of the general formula—

$$\begin{array}{c} X \\ | \\ R \\ | \\ C=O \\ | \\ H_2C.Hg.O.OC.CH_3 \end{array}$$

in which R represents an aromatic residue which may be substituted or not, and X an acid group.

4. A new mercury compound having therapeutic properties, comprising a compound of the general formula—

$$\begin{array}{c} As.O.(OH)_2 \\ | \\ C_6H_4 \\ | \\ C=O \\ | \\ H_2C.Hg.O.OC.CH_3 \end{array}$$

In testimony whereof we have signed our names to this specification.

AUGUST ALBERT.
JOHANNES PFLEGER.